United States Patent [19]
Dewey et al.

[11] Patent Number: 5,685,741
[45] Date of Patent: Nov. 11, 1997

[54] ON DEMAND PLUG-IN JACK CARD AND MONITOR FRAME

[75] Inventors: James D. Dewey, Plymouth; Steven W. Fields, Richfield, both of Minn.

[73] Assignee: ADC Telecommunications, Inc., Minneapolis, Minn.

[21] Appl. No.: 669,808

[22] Filed: Jun. 27, 1996

[51] Int. Cl.$^6$ .................... H05K 7/10; H01R 17/18
[52] U.S. Cl. .................................................. 439/668
[58] Field of Search .......................... 439/188, 668, 439/669

[56] References Cited

U.S. PATENT DOCUMENTS

| | | | |
|---|---|---|---|
| 4,768,961 | 9/1988 | Lau | 439/61 |
| 4,770,639 | 9/1988 | Lau | 439/668 |
| 4,797,114 | 1/1989 | Lau | 439/668 |
| 4,820,200 | 4/1989 | Lau | 439/668 |
| 4,840,568 | 6/1989 | Burroughs et al. | 439/668 |
| 5,199,878 | 4/1993 | Dewey et al. | 439/668 |
| 5,393,249 | 2/1995 | Morgenstern et al. | 439/668 |
| 5,432,847 | 7/1995 | Hill et al. | 439/668 |
| 5,439,395 | 8/1995 | Laukzemis | 439/668 |
| 5,546,282 | 8/1996 | Hill et al. | 439/668 |
| 5,552,962 | 9/1996 | Feustel et al. | 439/668 |
| 5,582,525 | 12/1996 | Louwagie et al. | 439/668 |

*Primary Examiner*—Neil Abrams
*Attorney, Agent, or Firm*—Merchant, Gould, Smith, Edell, Welter & Schmidt, P.A.

[57] ABSTRACT

An apparatus is disclosed for providing access to a plurality of telecommunications lines and for providing continuous monitoring access to the telecommunications signals on the lines. The apparatus includes a frame which carries a plurality of normally closed contacts and monitor ports and corresponding monitor circuits for providing continuous access to the telecommunications lines. The telecommunications lines are terminated on the normally closed contacts. A plurality of modules may be releasably attached to the frame with electrical circuit elements on the modules breaking the normally closed contacts to create a new signal path through the module. The modules need only be attached to the frame when direct access to the signal is desired.

12 Claims, 9 Drawing Sheets

ON DEMAND PLUG-IN JACK CARD AND MONITOR FRAME

FIELD OF THE INVENTION

The present invention relates generally to telecommunication devices. More particularly, the present invention relates to a digital distribution apparatus for use in a telecommunications network.

BACKGROUND OF THE INVENTION

The telecommunications industry requires cross-connecting and switching functions for a variety of equipment. The industry utilizes both manually operated digital system cross-connect (DSX) and electronic digital signal cross-connect (DCS) equipment for connection of two or more units of telecommunication equipment.

When utilizing DCS equipment, it is desirable to retain opportunities for manual cross-connect as well as test, access and monitoring functions independent of the DCS equipment. An example of DCS equipment providing manual cross-connect capabilities as well as test, access and monitoring capabilities independent of the DCS equipment is shown in commonly assigned U.S. Pat. No. 5,199,878 entitled "Plug-In Jack Card for Normally Closed Contacts".

Typically, in order to test, access and monitor telecommunications signals, a jack card carrying a monitor circuit, monitor port and IN and OUT ports must be installed in an apparatus having a frame for housing jack cards such that the jack card can receive the telecommunications signal flow-through. Without the jack card, make-before-break contacts permit the telecommunications signals to continue to pass through the DCS equipment and the signals are unavailable for outside access. With a jack card installed, the telecommunications signals pass through the jack card. IN and OUT ports are available on the jack cards for inserting a plug to break the signal flow-through and directly access one of the signals. The monitor port is typically available on the jack card for monitoring the signals flowing through the jack card without interrupting the signal.

Although prior art DCS equipment is useful for its intended purpose, it has some disadvantages. Frames for housing jack cards usually provide multiple side-by-side slots for receiving the jack cards. Jack cards must be installed for every telecommunications line terminated at the frame in order to monitor the flow-through signals and to directly access the telecommunications signals. However, when multiple jack cards are installed, the chance of operator error is significantly increased. Insertion of a plug into an IN or OUT port of the wrong jack card can cause erroneously broken communication signals when only monitoring of the signal is desired.

One solution to prevent such errors is to insert jack cards into the frame only on an as needed basis. This solution, however, requires a jack card to be inserted every time a signal merely needs to be monitored, which is typically a routine function. While it is acceptable to require insertion of a jack card each time a signal must be directly accessed, it is too time consuming to require the extra step of inserting a jack card into the frame each time a signal simply needs to be monitored. It is therefore desirable to retain monitoring functions of the telecommunications signals when jack cards are not installed in the frame. Thus, an apparatus is needed wherein telecommunications signals can be accessed for testing or rerouting when jack cards are installed in the apparatus and wherein the telecommunications signals can be monitored independent of the jack cards. In addition, it is desirable to have an apparatus configuration that achieves high density for receiving jack cards in order to maximize the number of telecommunication connections.

The present invention provides a solution to this and other problems, and offers other advantages over the prior art.

SUMMARY OF THE INVENTION

The present invention solves these problems by providing an apparatus providing access to a plurality of telecommunication lines with continuous monitoring capabilities. The apparatus includes a frame which carries a plurality of normally closed contacts. The telecommunication lines are terminated on the normally closed contacts. The frame also includes a plurality of monitor circuits, electrically connected to the normally closed contacts for providing monitoring functions without interrupting the telecommunications signals. The frame is configured to provide two faces, preferably in vertical alignment carrying monitor ports for accessing the monitor circuits. The two faces are spaced apart by a receiving chamber having a plurality of horizontally aligned slots defining a plurality of receiving channels, wherein each receiving channel is configured to receive a jack card. Each of the plurality of monitor ports is in substantially linear alignment with one corresponding receiving channel.

In accordance with one embodiment of the present invention, an apparatus as previously described is provided. In addition, a plurality of jack cards or modules are provided to be releasably attached to the frame with electrical circuit elements on the modules engaging the normally closed contacts to open the contacts and create a new signal path through the module upon insertion of the module into the frame.

In accordance with another embodiment of the invention a jack card or module is provided with electrical circuit elements on the module for engaging normally closed contacts connected to telecommunication lines, for opening the contacts and creating a new signal path through the module.

DETAILED DESCRIPTION

Referring now to the several drawing figures in which identical elements are numbered identically throughout, a description of the preferred embodiments of the present invention will now be provided.

Figure 1:
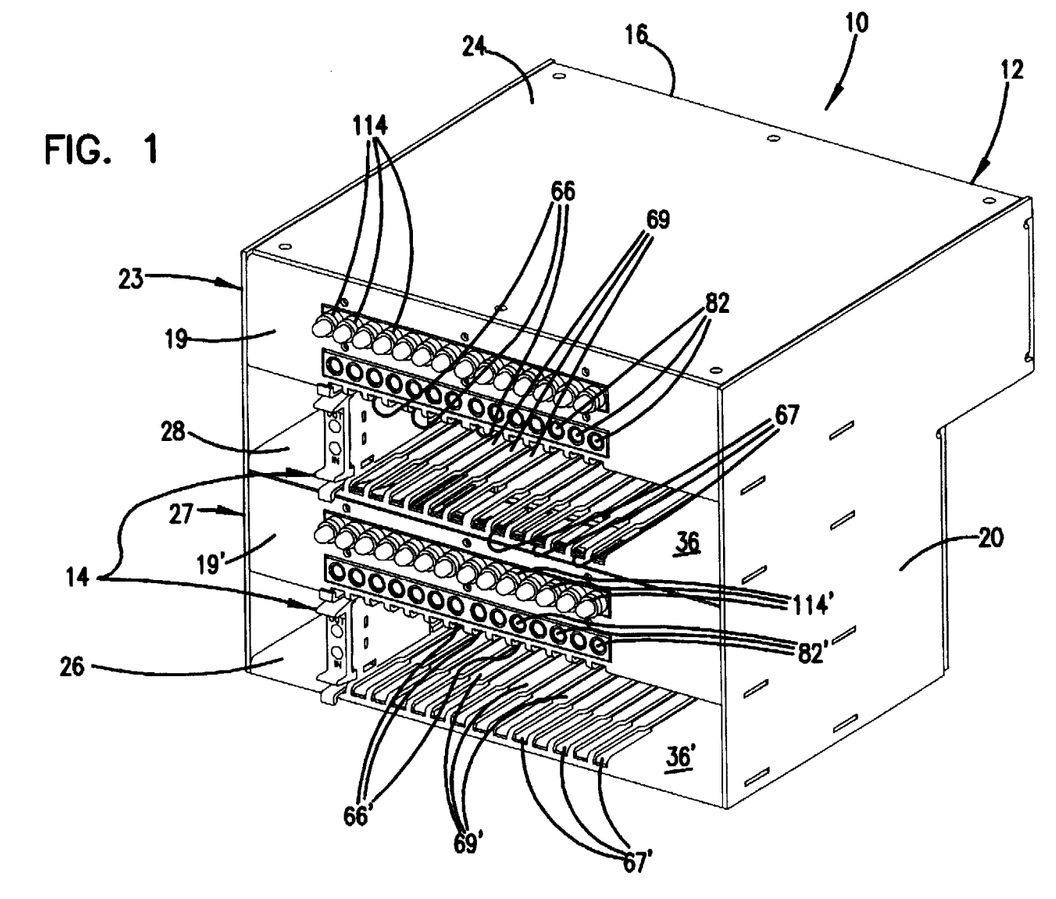
FIG. 1 is a front, top and right side perspective view of an apparatus according to the present invention.
Figure 2:
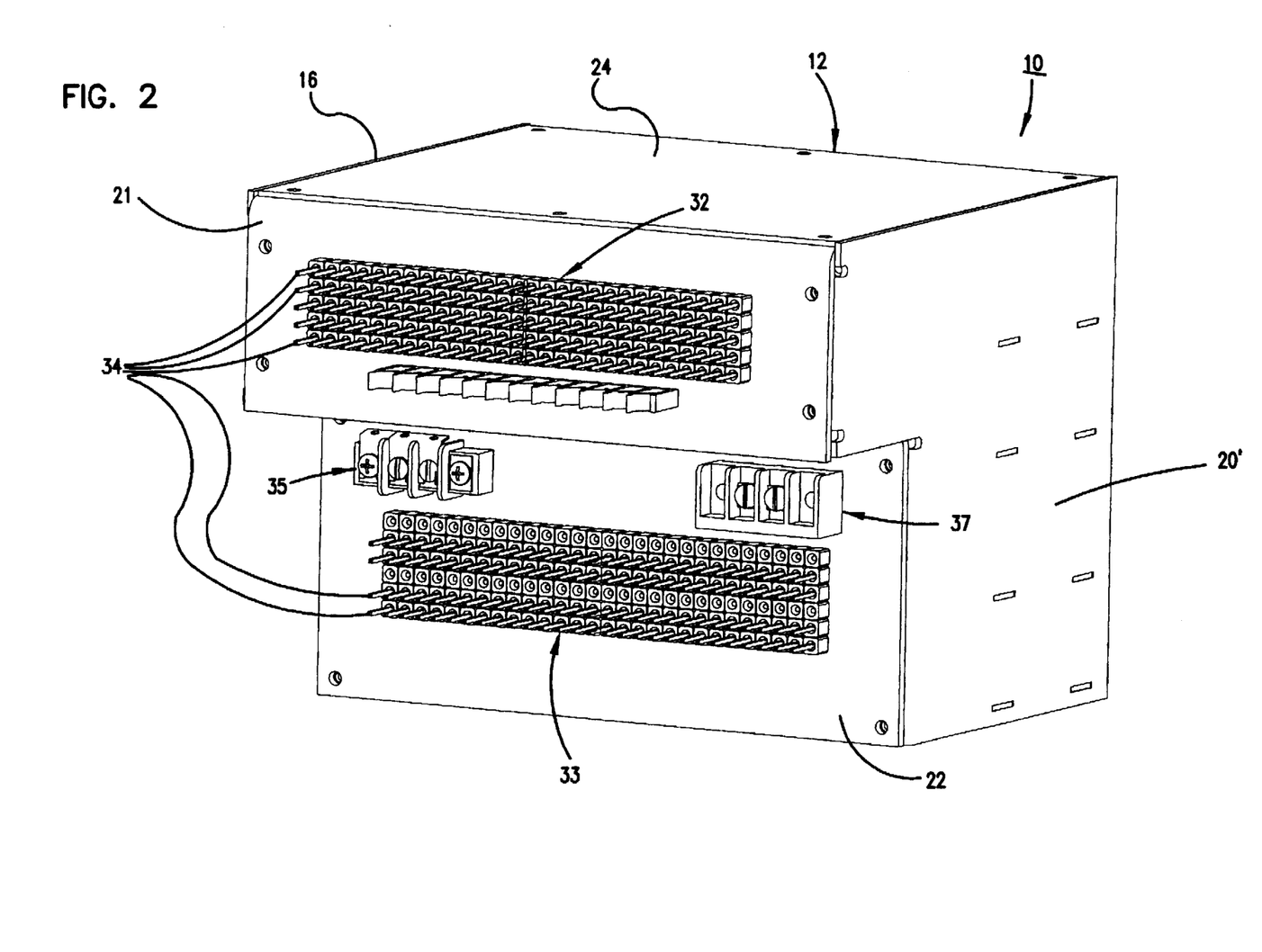
FIG. 2 is a rear, top and left side perspective view of the apparatus of FIG. 1.
Figure 3:
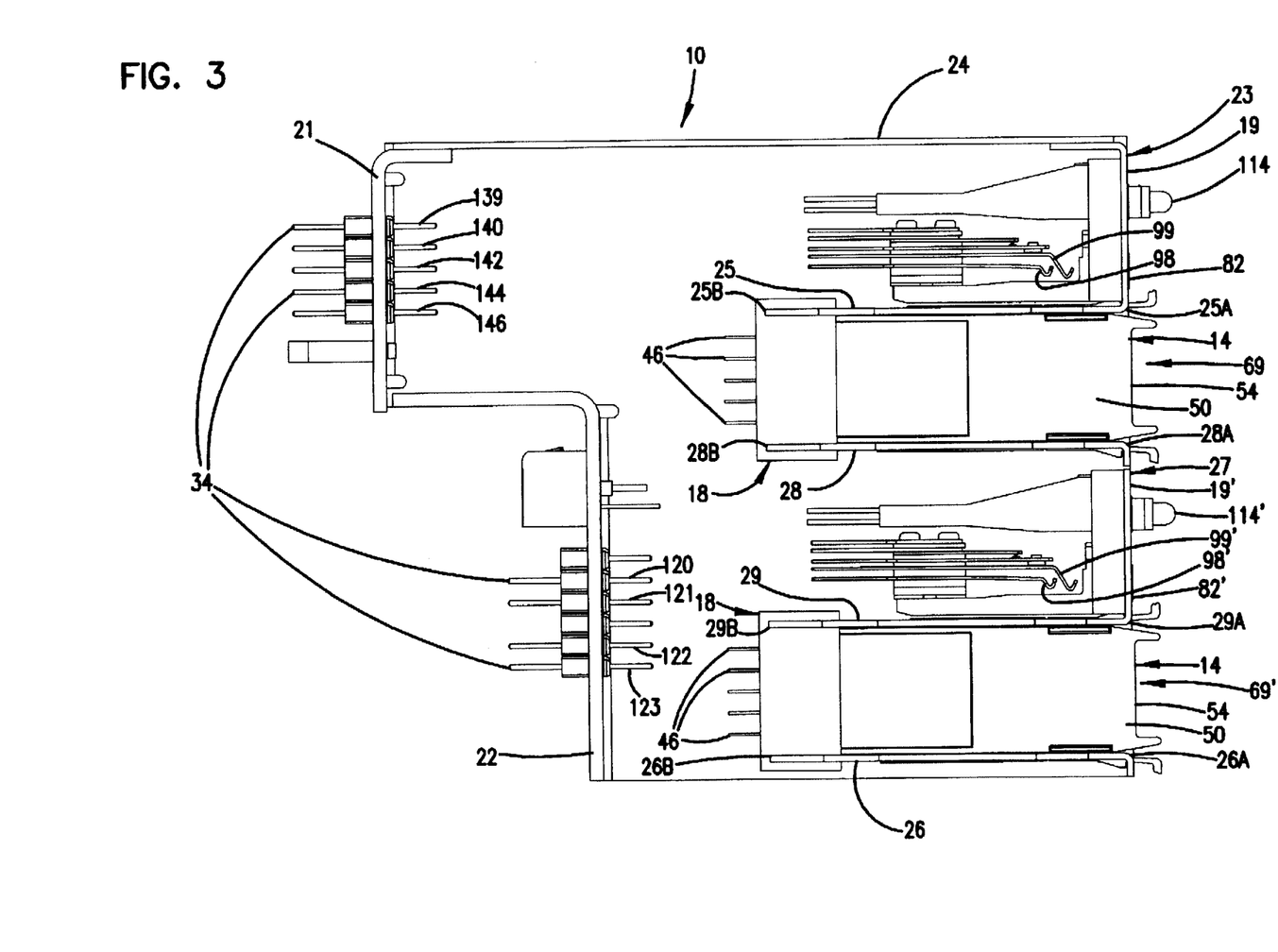
FIG. 3 is a cross-sectional left side view of the apparatus of FIG. 1 with two jack cards inserted therein.

With initial reference to FIGS. 1-3, the apparatus 10 is shown as including a frame 12 and a plurality of modules or jack cards 14, two of which are shown in FIGS. 1 and 2.

The frame 12 includes a chassis 16 and a plurality of connector assemblies 18 mounted within the chassis 16 as shown in FIG. 3. The chassis 16 preferably is formed of sheet metal and includes spaced apart side walls 20 and 20'. In the rear of the chassis 16, each side wall 20,20' has an upper portion connected by an upper rear wall 21 and a lower portion connected by a lower rear wall 22. The front of chassis 16 has an upper monitor section 23 having a top panel 24 and a bottom panel 25, a lower monitor section 27 having a top panel 28 and a bottom panel 29, and base panel 26.

The upper rear wall 21 and the lower rear wall 22 are provided With openings therethrough sized to receive termination blocks 32 and 33, respectively. In addition, a plurality of electrical contacts, shown generally at reference numerals 35 and 37, are provided on the lower rear wall 22 for supplying voltage and grounds to the circuitry within the frame 12. Blocks 32 and 33 are provided with wire wrap termination pins 34 extending therethrough. It will be appreciated that termination blocks having termination pins such as blocks 32,33 and pins 34 are well known in the art and form no part of this invention per se. In one preferred embodiment, the upper block 32 provides the cross-connect function through its termination pins 34.

As shown in FIGS. 1 and 3, the bottom panel 25 of the upper monitor section 23 and the top panel 28 of the lower monitor section 27 are vertically spaced apart in substantially parallel relation to define an upper jack card receiving chamber 36 which extends between side walls 20 and 20' and from leading edges 25A,28A of panels 25,28, respectively, to trailing edges 25B,28B. The bottom panel 29 of the lower monitor section 27 and the base panel 26 are vertically spaced apart in substantially parallel relation to define a jack card receiving chamber 36' which extends between side walls 20 and 20' and from leading edges 29A,26A of panels 29,26, respectively, to trailing edges 29B,26B. It will be apparent that the monitor sections 23,27 could alternatively be configured to be positioned below each of their respective receiving chambers 36,36'.

The upper monitor section 23 and the lower monitor section 27 of the chassis 16 are provided with a plurality of holes or ports extending therethrough. The plurality of ports in the upper and lower monitor sections 23 and 27 are monitor (or MON) ports 82 and 82', respectively. Preferably, each of the plurality of monitor ports 82,82' corresponds to one of a plurality of jack card receiving channels 69,69' within the receiving chambers 36,36', respectively. Each of the MON ports 82,82' has a corresponding monitor circuit 83,83' carried within the frame, shown and described hereinafter with reference to FIGS. 9A and 9B. The forward faces 19,19' of the upper and lower monitor sections 23,27 also provide a plurality of LED's 114,114' corresponding to each of the plurality of monitor ports 82,82'.

Figure 7:
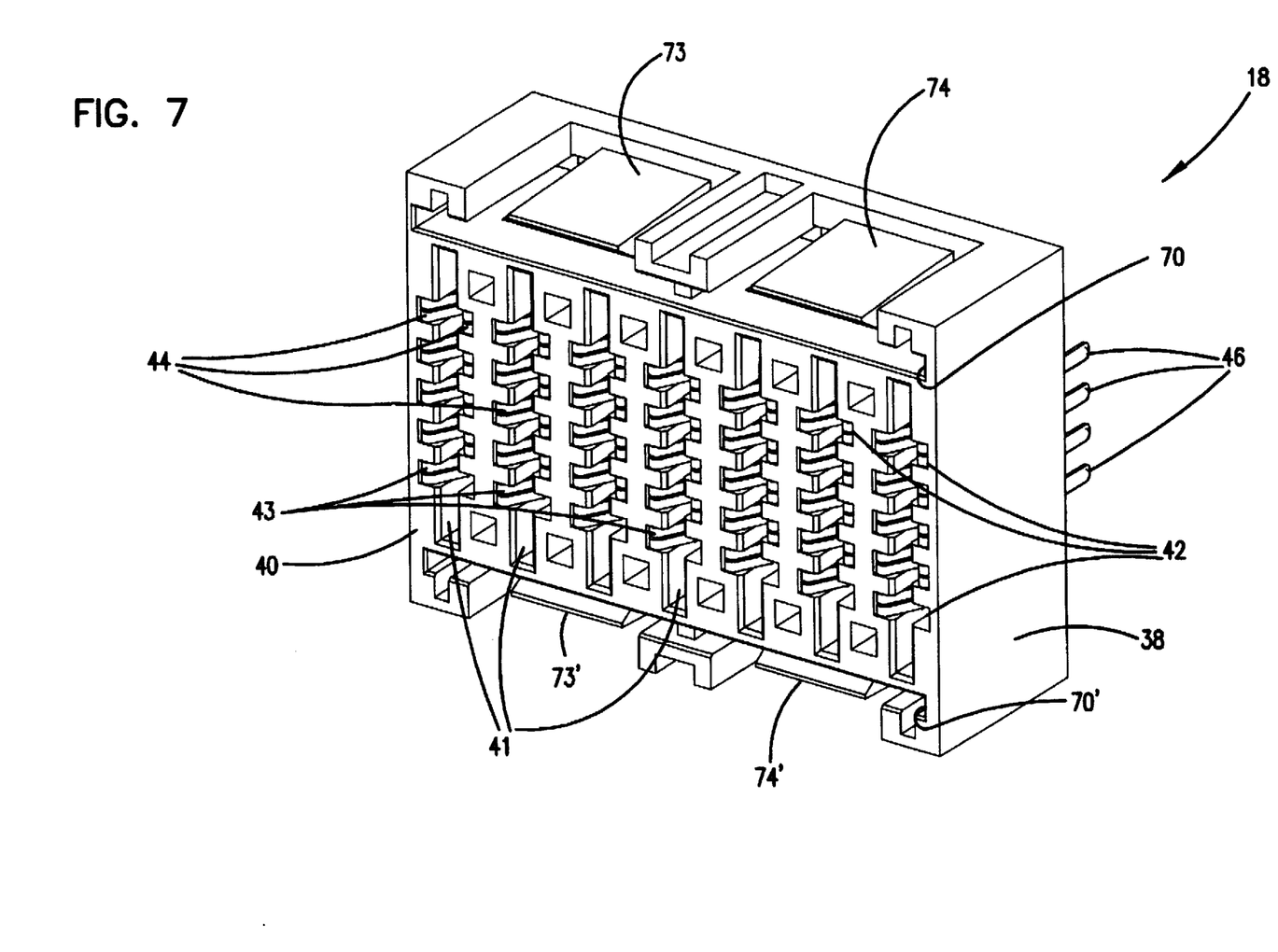
FIG. 7 is a front, top and right side perspective view of a connector assembly for use in the apparatus of FIG. 1.
Figure 8:
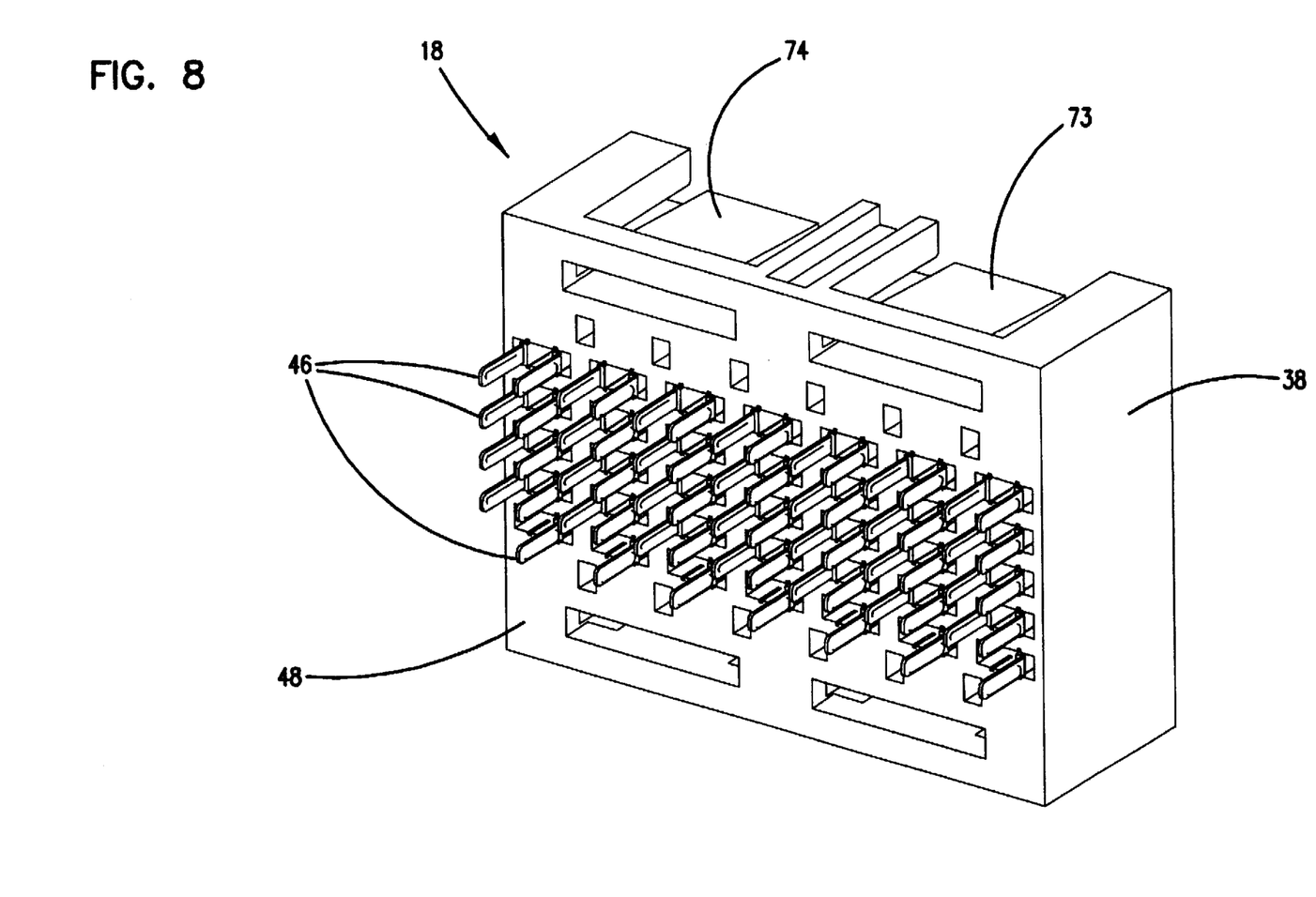
FIG. 8 is a rear, top and left side perspective view of the connector assembly of FIG. 7.

With reference to FIGS. 7 and 8, the connector assembly 18 includes a block dielectric body 38. The forward face 40 of the block body 38 is provided with a plurality of vertical slots 41, each having a plurality of vertically aligned contact receiving chambers 42. Each of the chambers 42 carries either one spring contact, shown generally by reference numeral 43, or a pair of spring contacts, shown generally by reference numeral 44, specifically numbered and described with reference to FIG. 9A. Generally, the chambers carrying paired spring contacts 44 cooperate to define a normally closed switch, shown schematically in FIG. 9A. The spring contacts 43,44 are provided with wire wrap termination pins 46 which extend through the rear face 48 of block 38 as shown best in FIG. 8.

The block bodies 38 are mounted in side-by-side relation within the jack card receiving areas 36 and 36' The block bodies 38 are sized to have a vertical dimension for the bodies 38 to extend between the bottom panel 25 of the upper monitor section 23 and the top panel 28 of the lower monitor section 27 when mounted in the upper jack card receiving area 36. Preferably, the lower jack card receiving area 36' has the same vertical dimensions as the upper jack card receiving area 36, such that the upper and lower jack card receiving areas 36 and 36' receive connector assemblies 18 having the same dimensions and configurations. In this preferred embodiment, the bodies 38 of the connector assemblies 18, when mounted in the lower jack card receiving area 36', extend between the bottom panel 29 of the lower monitor section 27 and the base panel 26. In one preferred embodiment, each connector assembly 18 is provided with seven vertical slots 41 for receiving seven jack cards.

When the connector assemblies 18 are mounted within the jack card receiving areas 36 and 36', the block bodies 38 are disposed adjacent the trailing edges 25B,28B of the upper jack card area 36 and the trailing edges 29B,26B of the lower jack card receiving area 36', with the pins 46 extending away from the jack card receiving areas 36 and 36'.

The connector assembly 18 includes upper and lower slotted guides 70 and 70', respectively. Guides 70,70' are provided to slidably receive extension members formed within the frame 12 for mounting the connector assembly 18 therein. Latches 73,74 and 73',74' contact the extension members when the connector assembly 18 is mounted within the frame 12. The vertical slots 41 of the connector assembly are sized to receive a jack card 14.

Figures 4, 5:
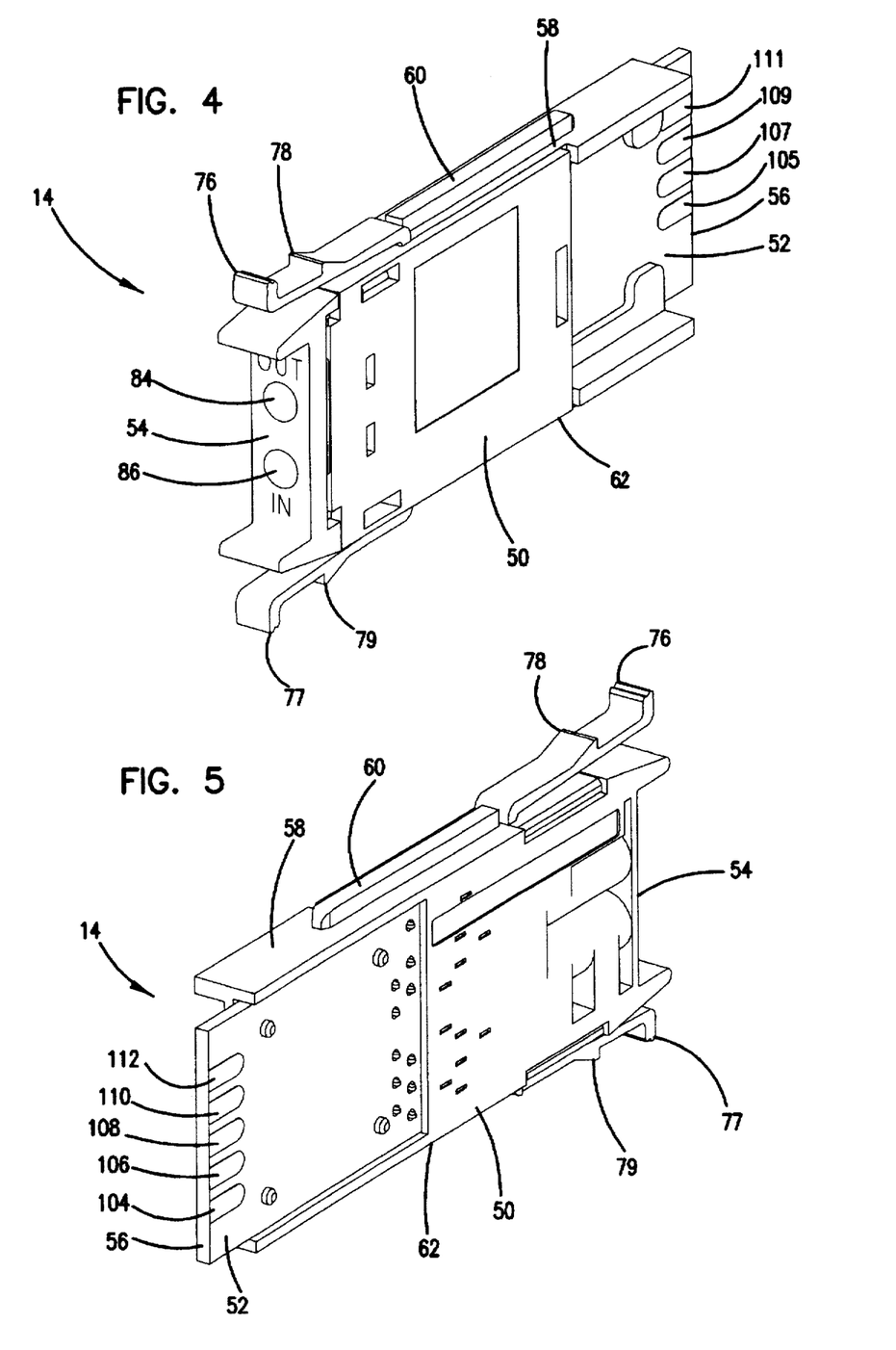
FIG. 4 is a front, top and right side perspective view of a jack card for use in the apparatus of FIG. 1.
FIG. 5 is a rear, top and left side perspective view of the jack card of FIG. 4.
Figure 6:
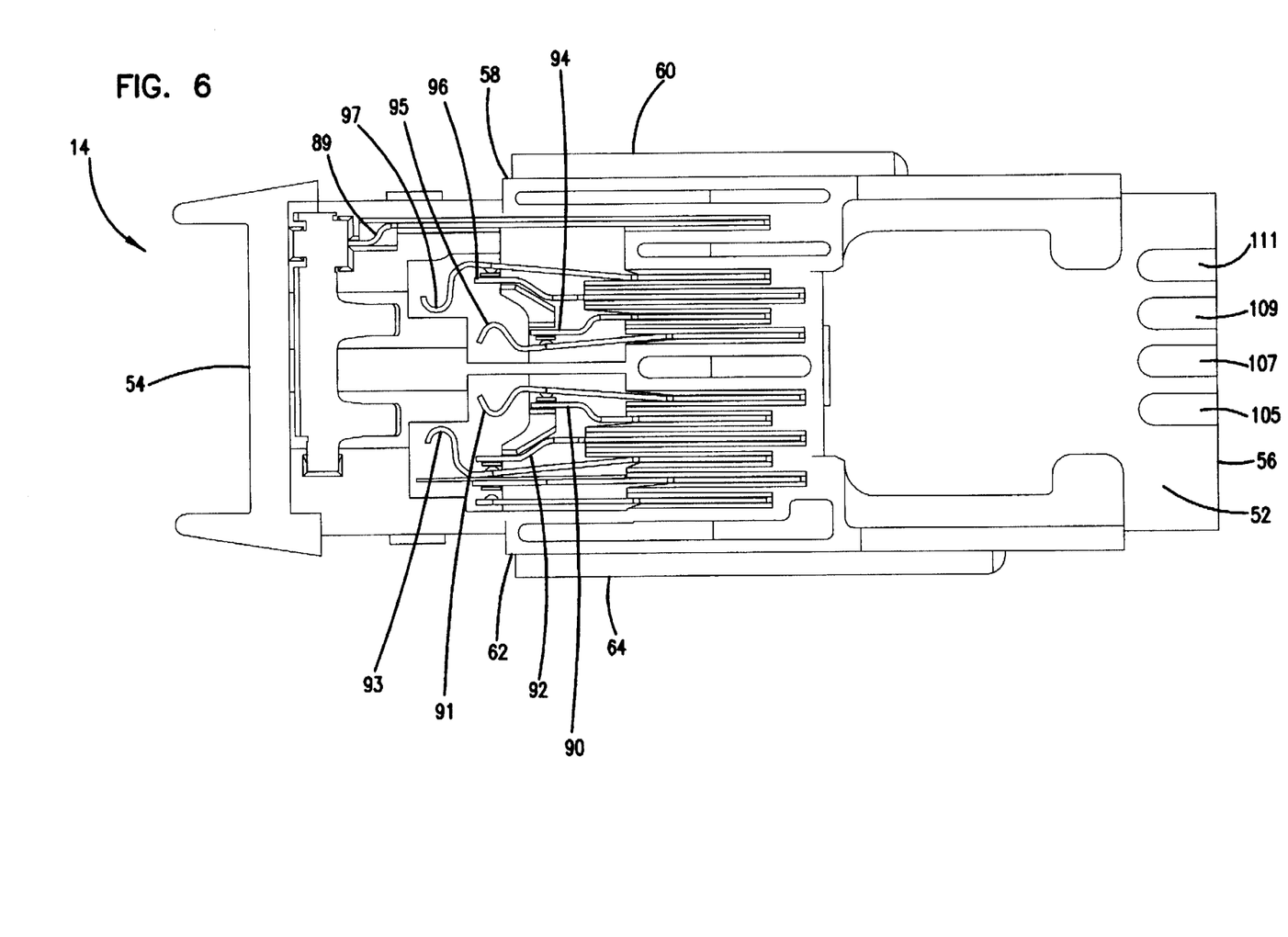
FIG. 6 is an elevation view of the right side of the jack card of FIG. 4 having a side cover removed and showing electrical circuit elements carried by the jack card of FIG. 4.

Referring now to FIGS. 4-6, the jack cards 14 include a dielectric body 50 which carries a printed circuit board card 52. The jack card 14 extends from a leading edge 54 of body 50 to a trailing edge 56 of card 52. The upper and lower edges 58,62 carry an upper axially extending rail 60 and a lower axially extending rail 64, respectively.

The vertical dimension (i.e., the distance between upper edge 58 and lower edge 62) of jack card 14 is selected for the card to be received within the jack receiving areas 36 or 36'. The upper edge 58 of the jack card 14 opposes either the bottom panel 25 of the upper monitor section 23 when inserted in the upper jack card receiving area 36 or the bottom panel 29 of the lower monitor section 27 when inserted in the lower jack card receiving area 36'. The lower edge 62 of the jack card 14 opposes either the top panel 28 of the lower monitor section 27 when inserted in the upper jack card receiving area 36 or the base panel 26 when inserted in the lower jack card receiving area 36'. The bottom panel 25 of the upper monitor section 23 and the bottom panel 29 of the lower monitor section 27 each have a plurality of upper transverse slots 66 and 66', respectively, sized to slidably receive the upper rail 60 of the jack card 14.

The top panel of the lower monitor section 27 and the base panel 26 each have a plurality of lower transverse slots 67 and 67', respectively, sized to slidably receive the lower rail 64 of the jack card 14. Each of the upper transverse slots 66,66' corresponds to one lower transverse slot 67,67', respectively, to form a jack card receiving channel 69,69'.

As shown in FIGS. 1, 3, and 7, upper slots 66,66', lower slots 67,67' and the forward face 40 of the connector assembly 18 are disposed for the elements of each to cooperate for a jack card 14 to be slidably received between panels 25 and 28 or panels 29 and 26, with the trailing edge 56 of card 52 receivable within a vertical slot 41 of body 38. With reference to FIGS. 4-6, retaining clips 76 and 77 are provided on the upper edge 58 and lower edge 62, respectively, of the jack card 14. The retaining clips 76,77 have ramps 78,79, respectively. The ramp 78 of the retaining clip 76 is releasably received within the upper slots 66 or 66' while the ramp 79 of the retaining clip 77 is releasably received in the corresponding lower slots 67 or 67', to releasably secure the jack card 14 in an inserted position in the jack card receiving area 36 or 36'.

Forward edge 54 of the jack card 14 is provided with a plurality of holes or ports extending therethrough. The plurality of ports includes an OUT port 84 and an IN port 86. As shown in FIG. 9B, the jack card 14 carries an electrical circuit 88 which includes a plurality of spring contacts. The plurality of spring contacts includes an IN tip normal spring 90 and an IN tip spring 91, an IN ring normal spring 92 and an IN ring spring 93. The plurality of springs also includes an OUT tip normal spring 94 and an OUT tip spring 95, and OUT ring normal spring 96 and an OUT ring spring 97. Finally, the electrical circuit also includes a sleeve ground spring 89. Springs 91 and 93 are disposed to be engaged by the tip and ring, respectively, of an electrical jack plug (not shown) inserted within the IN port 86. Similarly, springs 95 and 97, are selected to be engaged by the tip and ring of an electrical jack plug inserted within the OUT port 84. Spring pairs 90–91 and 92–93 are in normal contact in the absence of a plug within the IN port 86, and will be opened by insertion of a plug. Similarly, spring pairs 94–95 and 96–97 are in normal contact in the absence of a plug within the OUT port 84, and will be opened by insertion of a plug. Springs such as springs 90–97 are retained within the dielectric body 50 of the jack card 14 in a manner similar to springs retained in a body such as that shown in commonly assigned U.S. Pat. No. 4,840,568.

As shown in FIGS. 4-6, the trailing edge 56 of card 52 is provided with a plurality of electrical contact pads 104–112 which are electrically connected to springs 89–97. In addition to permitting test access (as will be described), the circuit board 52 may be provided with additional electrical circuitry, such as repeaters or other circuit enhancement circuitry. The contact pads 105–112 are disposed on opposite sides of the card 52. With this embodiment, the card 52 is used in conjunction with opposing paired contacts 44. Alternatively, the contact pads 105–112 could be disposed on the same side of the card 52 and used in conjunction with side-by-side paired contacts 44 (not shown herein). The contact pad 104 may be disposed on either side of the card 52, such that it engages a single spring contact 43. It will be apparent that the single spring contacts 43 and the paired spring contacts 44 may be arranged in any alignment within the vertical slots 41, so long as the jack card contact pads 104–112 are configured on the card 52 to correspond to the appropriate spring contacts 43,44. For example, in one preferred embodiment, each of the single spring contacts 43 is located in the top chamber 42 of the corresponding vertical slot 41 and the contact pads 104–112 are arranged on the card 52 accordingly.

With reference to FIG. 7, the plurality of spring contacts 43,44 are retained within the receiving chambers 42 of the connector assembly 18. The paired spring contacts 44 cooperate to define normally closed spring switches. Namely, the paired spring contacts 44 are in electrical engagement during the absence of a jack card 14 within slots 41. Preferably, the paired spring contacts 44 are also make-before-break normally closed spring contacts which make electrical contact with a pad such as contact pads 105–112 before breaking or opening the electrical connection across the spring contacts 44. Such make-before-break normally closed spring contacts may be configured, for example, in an embodiment such as those disclosed in commonly assigned U.S. Pat. No. 5,199,878.

Figure 9A:
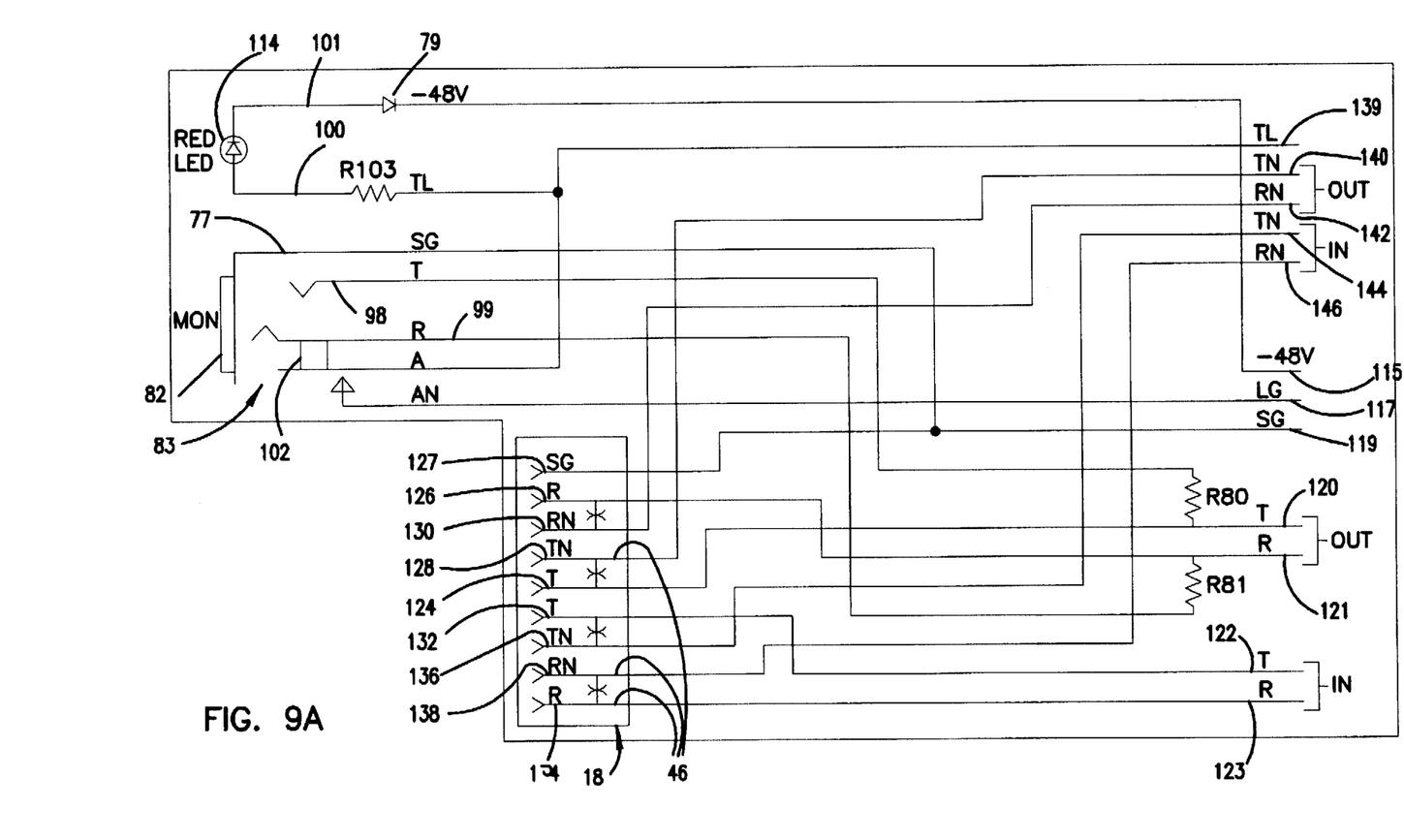
FIG. 9A is an electrical schematic of a monitor circuit, corresponding connector assembly contacts, and electrical conductors for connection to termination pins in the apparatus of FIG. 1, without having a corresponding jack card inserted therein.
Figure 9B:
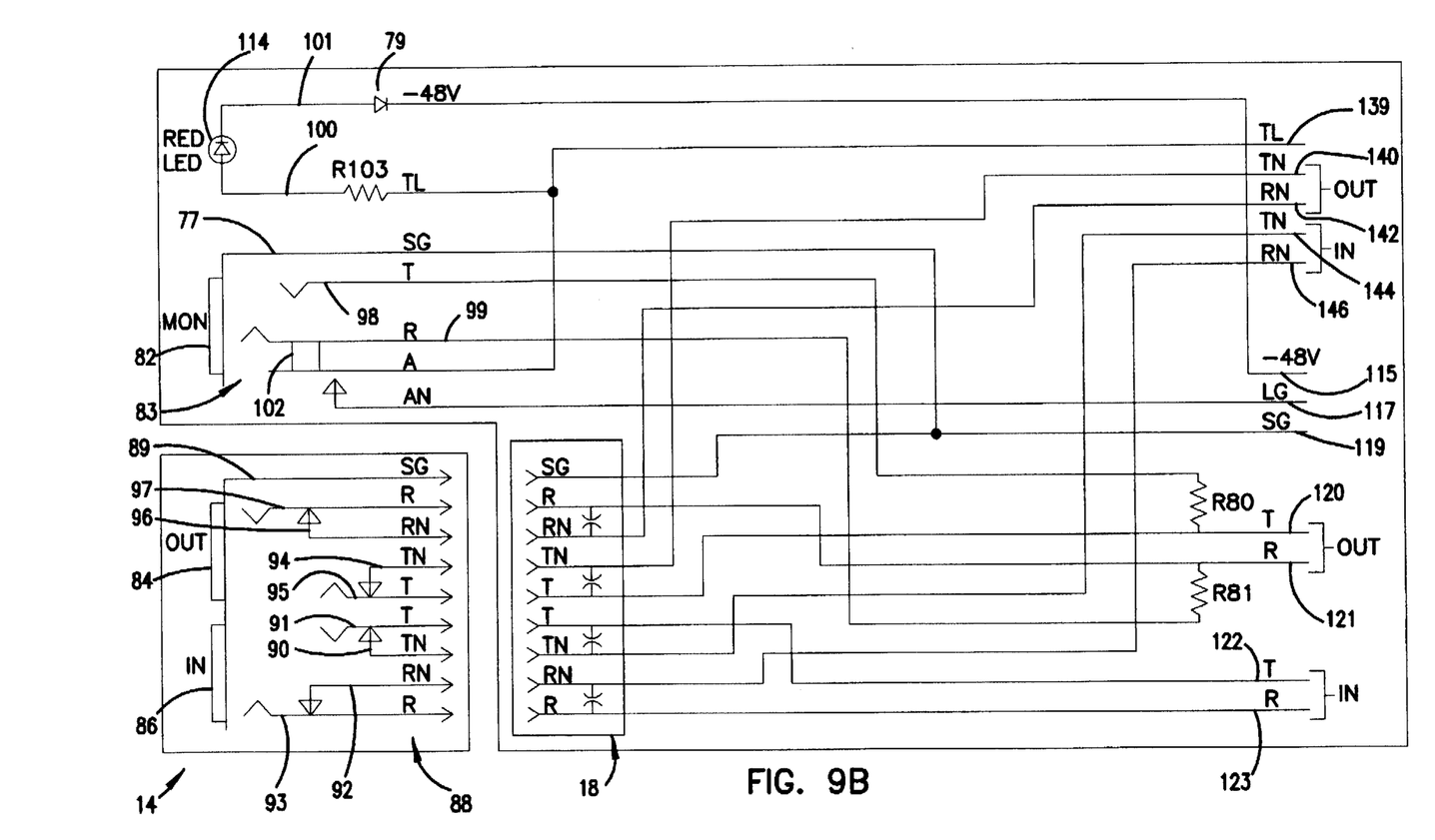
FIG. 9B is an electrical schematic of the monitor circuit, the corresponding connector assembly contacts and the electrical conductors for connection to termination pins as shown in FIG. 9A, schematically showing a corresponding jack card inserted therein.

FIGS. 9A and 9B show the internal electrical schematic of one of the monitor circuits 83,83' within the frame 12 having a connector assembly 18 mounted therein and electrically connected to the termination pins 34 by several electrical conductors. With reference to FIG. 9A, a monitor tip spring 98, a monitor ring spring 99, a first LED spring 100 and a second LED spring 101 are provided. The LED 114 is connected to a voltage source 115 via LED spring 101 and diode 79. The LED 114 is also connected to ground 117 via LED spring 100 and resistor R103. Springs 100 and 101 are electrically charged by means of monitor ring spring 99 urging spring 100 via a dielectric pusher 102. The LED 114 is illuminated upon insertion of a plug in the MON port 82. The LED spring 100 is also electrically connected to a termination pin 34 via electrical conductor 139.

Tip and ring conductors of a telecommunications network may be terminated on the wire wrap termination pins 34 of blocks 32 and 33. Generally, each of the pins 34 has a corresponding conductor hardwired to one of the pins 46 of the connector assembly 18. Specifically, OUT tip and ring conductors 120 and 121 and IN tip and ring conductors 122 and 123 are preferably connected to selected pins 34 in block 33, shown generally in FIG. 2. Cross-connect OUT tip normal and ring normal conductors 140 and 142 and cross-connect IN tip normal and ring normal conductors 144 and 146 are preferably connected to selected pins 34 of block 32, shown generally in FIG. 2. In addition, tracer lamp conductor 139 is preferably connected to a pin 34 on block 32. Finally, a voltage conductor 115, a ground conductor 117 and a sleeve ground conductor 119 are preferably hardwired to selected electrical contacts, shown generally at reference numerals 35 and 37 in FIG. 2.

OUT tip and ring conductors 120 and 121 electrically engage connector assembly OUT tip and ring spring contacts 124 and 126 through selected pins 46. The tip and ring spring contacts 124 and 126 are normally connected to OUT tip normal and ring normal spring contacts 128 and 130, respectively. The OUT tip normal and ring normal spring contacts 128 and 130 electrically engage the cross-connect OUT tip normal and ring normal conductors 140 and 142 through selected pins 46.

The IN tip and ring conductors 122 and 123 electrically engage connector assembly IN tip and ring spring contacts 132 and 134, respectively, through selected pins 46. The IN tip and ring spring contacts 132 and 134 are normally electrically connected to IN tip normal and ring normal spring contacts 136 and 138, respectively. The IN tip normal and ring normal spring contacts 136 and 138 electrically engage cross-connect IN tip normal and ring normal conductors 144 and 146, respectively, through selected pins 46.

The connections between the connector assembly OUT tip and ring spring contacts 124 and 126 and the OUT tip normal and ring normal spring contacts 128 and 130, and between the connector assembly IN tip and ring spring contacts 132 and 134 and the IN tip normal and ring normal spring contacts 136 and 138, provide flow-through paths for telecommunications signals in the absence of a jack card. A sleeve ground contact 127 is connected to the sleeve ground conductor 119 through a selected pin 46.

The monitor springs 98 and 99 are connected across resistors R80 and R81 to selected wire wrap termination pins 34, specifically, to OUT tip and ring conductors 120 and 121. In the preferred embodiment, the resistors R80 and R81 are 430 ohm dropping resistors which establish the monitor level at −20dB relative to the signal level at the OUT tip and ring conductors 120 and 121. The monitor circuit 83 also has a sleeve ground conductor 77 connected to the sleeve ground conductor 119.

With reference to FIG. 9B, an electrical schematic drawing of a jack card 14 inserted into a receiving channel 69 of the frame 12, is shown. Once a jack card 14 is inserted into the frame 12 and received within a vertical slot 41 of the connector assembly 18, the jack card 14 breaks the normal connections shown in FIG. 9A. With the normal connections in the connector assembly 18 broken, as shown in FIG. 9B, the jack card OUT tip and ring springs 95 and 97 electrically engage connector assembly OUT tip and ring spring contacts 124 and 126. The jack card OUT tip normal and ring normal springs 94 and 96 electrically engage connector assembly OUT tip normal and ring normal spring contacts 128 and 130. The jack card IN tip and ring springs 91 and 93 electrically engage the connector assembly IN tip and ring spring contacts 132 and 134, and the jack card IN tip normal and ring normal springs 90 and 92 electrically engage the connector assembly IN tip normal and ring normal spring contacts 136 and 138. Finally, the sleeve ground spring 89 electrically engages the sleeve ground contact 127 of the connector assembly.

With the apparatus described, a signal flows through the apparatus 10 without modification or access in the absence of a jack card 14. The presence of a jack card results in the signal flowing through the circuitry 88 of the jack card 14. Insertion of a plug into ports 84 or 86 permit test access to the telecommunications network signals. Insertion of a plug into one of the plurality of MON ports 82,82', however, permits monitoring of the telecommunications network signals with or without a jack card 14 inserted in the frame.

The present apparatus is particularly helpful to prevent unintended interruption of a signal when only monitoring is required. That is, monitoring the telecommunications network signals can be performed without having a jack card 14 inserted in the frame. Thus, when it is desired to access the flow-through signals for testing or other uses, a jack card 14 simply needs to be inserted into the appropriate receiving channel and a tip and ring plug inserted into the IN or OUT ports of the jack card. Once access to the signal is no longer desired, the jack card may remain in the receiving channel or may be removed. Monitoring is always available through the MON port 82. The particular design of the apparatus can receive a large number of telecommunications lines in a particularly compact apparatus. In addition, the rear section of the apparatus separates the cross-connect functions for ease of use and to reduce operator errors.

The present invention is to be limited only in accordance with the scope of the appended claims, since person skilled in the art may devise other embodiments still within the limits of the claims. Thus, modification and equivalence of the disclosed concepts which will readily occur to one skilled in the art are intended to be included within the scope of the claims.

What is claimed is:

1. An apparatus for providing access to a plurality of telecommunications lines, said apparatus comprising:

a plurality of normally closed contacts, each of said contacts having means for terminating said telecommunications lines on said contacts, said plurality of contacts including a plurality of pairs of first and second contacts biased into electrical connection for a signal flow on said telecommunications lines terminated at said first and second contacts of a pair to pass through said first and second contacts of a pair, said plurality of pairs including an IN pair and an OUT pair;

a plurality of monitor springs with at least one of said monitor springs electrically connected to one of said first and second contacts of a pair; and a frame supporting said plurality of normally closed contacts and said plurality of monitor springs, said frame having a forward end with first and second substantially horizontal panels extending rearwardly therefrom, said forward end having first and second faces with said first and second panels spaced therebetween, said first and second panels defining a chamber with at least one of said panels having a plurality of slots defining horizontally aligned receiving channels for receiving modules therein; and a plurality of monitor ports, each of said plurality of monitor ports carried on one of said forward faces and positioned in substantially linear alignment with a corresponding receiving channel, each of said plurality of monitor ports configured for receiving a plug to electrically engage said monitor springs such that a telecommunications signal flowing therethrough can be monitored without interruption of said signal flow;

wherein each of said modules has circuit interruption means for opening said normally closed contacts against said bias such that said signal flow can be redirected.

2. An apparatus according to claim 1 wherein said terminating means includes termination pins; and wherein said frame further includes a rear end having upper and lower rear faces with at least one of said rear faces carrying said termination pins.

3. An apparatus according to claim 2 wherein said upper rear face is laterally spaced from said lower rear face, with a bottom edge of said upper rear face and a top edge of said lower rear face positioned in substantially a same plane.

4. An apparatus according to claim 1 wherein said two forward faces are in substantially planar, vertical alignment.

5. An apparatus according to claim 1 wherein said terminating means includes a plurality of pairs of OUT conductors; and wherein each of said plurality of monitor springs is electrically connected to one of said OUT conductors across a resistance.

6. An apparatus according to claim 1 wherein said frame further comprises third and fourth panels extending rearwardly from said forward end in substantially parallel relation, said third and fourth panels spaced beneath said second forward face, with said panels defining a chamber therebetween; and wherein at least one of said third and fourth panels has a plurality of slots defining horizontally aligned receiving channels for receiving modules therein.

7. An apparatus for providing access to a plurality of telecommunications lines, said apparatus comprising:

a frame having a forward end with first and second substantially horizontal panels extending rearwardly therefrom, said forward end having first and second forward faces with said first and second panels spaced therebetween, said first and second panels defining a chamber with at least one of said panels having a plurality of slots defining horizontally aligned receiving channels for receiving modules therein; and a plurality of normally closed contacts carried on said frame, each of said contacts having means for terminating said telecommunications lines on said contacts, said plurality of contacts including a plurality of pairs of first and second contacts biased into electrical connection for a signal flow on said telecommunications lines terminated at said first and second contacts of a pair to pass through said first and second contacts of a pair, said plurality of pairs including an IN pair and an OUT pair;

a plurality of monitor springs, with at least one of said monitor springs electrically connected to one of said first and second contacts of a pair;

a plurality of monitor ports carried on at least one of said forward faces and positioned in substantially linear alignment with a corresponding receiving channel, each of said monitor ports configured for receiving a plug for electrically engaging said monitor springs without interruption of said signal flow;

a plurality of modules releasably insertable into said receiving channels of said frame, each of said modules having circuit interruption means on a first side thereof for opening said normally closed contacts against said bias upon being inserted into said receiving channels;

each of said modules including a pair of first and second IN springs and a pair of first and second OUT springs with springs of a pair biased into normally closed electrical connection;

at least one port on a second side of said module for receiving a plug separating and electrically engaging one of said first and second IN springs and said first and second OUT springs; and a plurality of electrically conductive contact locations disposed on said module, said plurality of electrically conductive contact locations including at least a pair of first and second IN contact locations and a pair of first and second OUT contact locations, said locations disposed for said first IN contact location to electrically engage said first IN contact, said second IN contact location to electrically engage said second IN contact, said first OUT contact location to electrically engage said first OUT contact and said second OUT contact location to electrically engage said second OUT contact upon said securing of said module to said frame;

wherein said first IN spring is electrically connected to said first IN contact location, said second IN spring is electrically connected to said second IN contact location, said first OUT spring is electrically connected to said first OUT contact location and said second OUT spring is electrically connected to said second OUT contact location.

8. An apparatus according to claim 7 wherein said terminating means includes a plurality of pairs of OUT conductors; and wherein each of said plurality of monitor springs is electrically connected to one of said OUT conductors across a resistance.

9. An apparatus according to claim 8 wherein said resistance is 430 ohms.

10. An apparatus according to claim 7 wherein said normally closed contacts are make-before-break normally closed contacts.

11. An apparatus according to claim 7 wherein a signal flow can be monitored upon insertion of a plug into a monitor port corresponding to monitor springs, said monitor springs electrically connected to said terminating means, without said frame having a module inserted therein.

12. A signal flow-through module for providing access to telecommunications lines upon insertion into a frame having a first panel and a second panel, with at least one of said first and second panels having a plurality of receiving slots defining a plurality of channels for receiving said modules, said frame carrying a plurality of normally closed contacts, each of said contacts having an electrical conductor for terminating a telecommunications line, said plurality of contacts including a plurality of pairs of first and second contacts biased into electrical connection for a signal flow on said telecommunications lines terminated at said first and second contacts of a pair to pass through said first and second contacts of a pair, said plurality of pairs including an IN pair and an OUT pair, said frame carrying a plurality of monitor circuits electrically connected to said contacts, said module comprising:

a first end;

a second end opposite said first end;

at least one bar extending along an edge of said module interposed between said first end and said second end, said bar engaging said slot formed in one of said upper and lower panels of said frame;

circuit interruption means located on said second end of said module for opening said normally closed contacts against said bias upon insertion of said module into one of said channels of said frame;

a pair of first and second IN springs and a pair of first and second OUT springs with springs of said pairs located on said module and biased into normally closed electrical connection with each of said pairs of springs;

an IN port on said first end of said module for receiving a plug separating and electrically engaging one of said first and second IN springs;

an OUT port on said first end of said module for receiving a plug separating and electrically engaging one of said first and second OUT springs;

a plurality of electrically conductive contact locations disposed on said second end of said module, said plurality of electrically conductive contact locations including at least a pair of first and second IN contact locations and a pair of first and second OUT contact locations, said locations disposed for said first IN contact location to electrically engage said first IN contact, said second IN contact location to electrically engage said second IN contact, said first OUT contact location to electrically engage said first OUT contact and said second OUT contact location to electrically engage said second OUT contact upon said securing of said module to said frame; and wherein said first IN spring is electrically connected to said first IN contact location, said second IN spring is electrically connected to said second IN contact location, said first OUT spring is electrically connected to said first OUT contact location and said second OUT spring is electrically connected to said second OUT contact location.

* * * * *